Sept. 4, 1951 O. K. HEARNE 2,566,612
FISHING FLOAT
Filed April 2, 1948
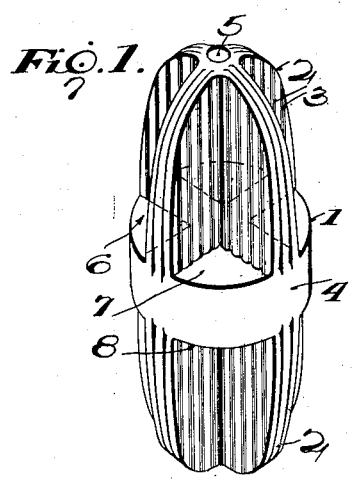
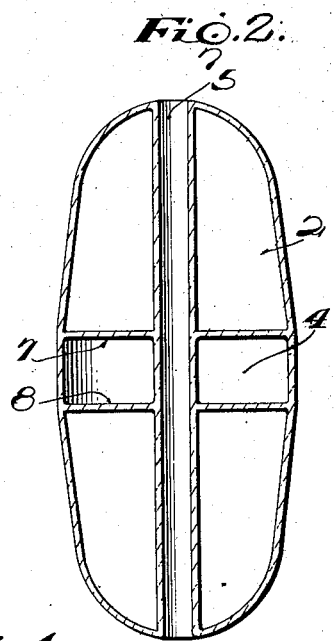
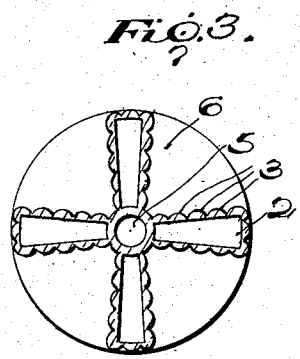
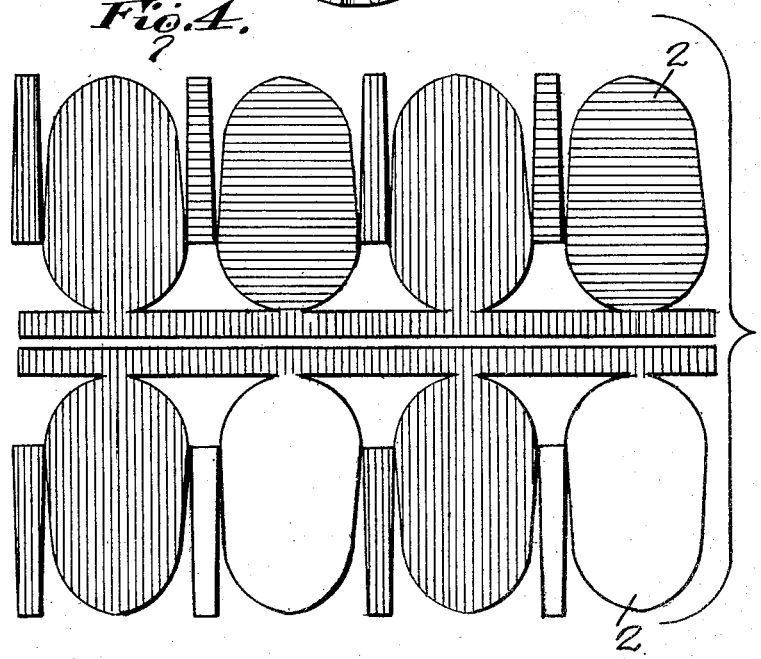
INVENTOR.
Oliver K. Hearne.
BY
Cameron, Kerkam & Sutton.
Attorneys.

Patented Sept. 4, 1951

2,566,612

UNITED STATES PATENT OFFICE 2,566,612

FISHING FLOAT

Oliver K. Hearne, Jacksonville, Fla.

Application April 2, 1948, Serial No. 18,661

2 Claims. (Cl. 43—44.9)

This invention pertains to an improved fishing float designed to be used in conjunction with live bait or with artificial lures for the purpose of maintaining the bait or lure at a desired depth below the surface of the water. The float is so constructed as to be easily adjustable on the fishing line and is of an improved design and shape to provide maximum visibility under all conditions of light and water.

The preferred embodiment of the float is broadly elliptical over all in outline, the top and bottom sections thereof comprising four vaned segments designed to catch and reflect light and improve visibility, the center section comprising a cylindrical hollow area designed to provide buoyancy.

It is therefore one object of this invention to provide an improved fishing float of such design and color scheme as to catch and reflect light rays to enable the angler to maintain the float under observation at all times and under all light conditions.

It is a further object of this invention to provide such a float which is so designed as to cause a popping or bubbling action when drawn through the water or when suddenly jerked by the angler.

It is a further object of this invention to provide the vanes of the float with ribbed surfaces of different colors to increase visibility by cross-reflection of light.

Other and further objects of this invention will become apparent as this specification proceeds.

Referring to the drawings,

Fig. 1 is a plan view of the preferred embodiment of the float;

Fig. 2 is a cross section of the preferred embodiment of the float;

Fig. 3 is an end view of the preferred embodiment of the float showing the rectangular disposition of the vanes and the ribbed configuration there; and Fig. 4 is a lay-out plan of the vane color scheme.

In Fig. 1 of the drawings, 1 indicates a fishing float of any suitable material but which is preferably formed of a light, strong thermoplastic material which may be cast or molded in the desired shape. Four longitudinally extending peripherally curved vane members 2 are illustrated disposed at right angles to each adjacent vane at the upper and lower extremities of the float body. As shown, vanes 2 are preferably hollow and are tapered in thickness from their outer to their inner extremities, providing an acute angle of meeting at their inner jointing edges of approximately 85°. Vanes 2 are preferably provided with parallel ribs 3 which are appropriately molded therein or applied thereto. Each vane preferably carries five of these raised ribs 3 on each of its surfaces, and at least two thereof on its peripheral edges, the function of the ribs being to impart increased light-reflecting surface to the vane and to provide cross-reflection of light between opposed vane surfaces. Ribs 3 preferably extend outwardly from the vane surface to a distance equal to approximately one third of the vane thickness at its inner extremity.

The color scheme of the vanes is preferably predominately white, red and blue, opposed pairs of faces being alternately colored white and red at one extremity of the float, and blue and red at the other extremity thereof. In this fashion, opposed faces of the vanes are similarly colored, providing alternate "pockets" of color about the periphery of the float, at one extremity alternate "pockets" of white and red, at the other extremity alternate "pockets" of blue and red to make the float readily adaptable to the light and water conditions prevailing. On a bright day optimum visibility will be obtained from the blue and red extremity, on a dark day optimum visibility and light reflection will be obtained from the white and red extremity of the float. Thus, on a dark day the white and red extremity of the float should be above the water and on a bright day the blue and red extremity should be so disposed. This provision of vane color combinations is schematically shown in Fig. 6 of the drawings. Obviously, that portion of the float which is uppermost on the line will be above the water when the float is in vertical position in the water.

Due to the tapering of the vanes from their outer extremities to their inner joining edges the opposed surfaces of the vanes make an acute angle with each other of approximately 85°. This angularity of the faces greatly increases cross-reflection of light therefrom and hence greatly increases visibility. The ribbed configuration of the faces further increases this cross-reflection of light between faces.

As illustrated, cylindrical air chamber 4 is provided centrally of the float body to impart buoyancy to the float and to enable it to stand in a true vertical position on the surface of the water, when at rest.

Tube or bore 5 is shown disposed centrally of the float on its longitudinal axis to provide free passage therethrough for the fishing line.

Due to the vaned configuration of the extremities of the float, pockets 6 are formed about the center periphery thereof, defined by the upper and lower walls 7 and 8 of air chamber 4 and the inner faces of vanes 2. Pockets 6 are of substantially rectangular cross section and are so disposed about the center periphery of the float as to cause a popping or disturbing action in the water when the float is pulled to a horizontal position and drawn toward the angler. This popping or disturbance tends to act as an attraction to any game fish in the vicinity of the float at the time of movement.

A suitable stop or button is preferably provided upon the fishing line above the float to limit the length of line which may pass through bore 5.

Referring to the embodiment of the invention shown in Fig. 1 of the drawings, the vanes 2 may be painted or otherwise colored as desired, for example, alternately disposed pairs of vanes may be painted white with the opposed surfaces painted red, green, or blue. It has been determined, however, that the best light reflective action is realized when oppositely disposed faces of opposed pairs of vanes are painted white, the remaining faces being painted red, and/or blue, as desired. By this provision of colors from light to dark, excellent visibility is obtained regardless of conditions of light or water. The vanes may be painted with phosphorescent paint for night fishing.

The preferred embodiment of the float is preferably on the order of 3½" in length by 1½" in diameter at its center, though these dimensions may be varied widely without departing from the spirit of the invention.

The preferred method of using the float is as follows: after determining the depth at which it is desired to fish, a stop or button member is fastened to the fishing line at the appropriate distance from its extremity. If the day is dark the white and red extremity of the float is placed uppermost on the line; if the day is bright the blue and red extremity is placed uppermost. With the appropriate extremity of the float uppermost the line is passed through central aperture 5 of the float body and the hook and sinker are tied to the lower end thereof. An appropriate bait is then placed on the hook and the assembly is cast or dropped into the desired fishing spot. As the float is free to ride along the line between the hook and the stop it will ride down to the hook during the cast and at the completion of the cast the weight of the hook, sinker and bait will draw the line down through tube 5 until the stop member impinges against the top of the float, maintaining the bait at the desired depth and the float in a vertical position in the water. To increase the attractiveness to the fish of the float-bait combination the angler may periodically jerk or twitch the rod tip which will pull the float suddenly through the water, causing compression of water in pockets 6 and expression of compressed water therefrom, producing a popping or bubbling disturbance in the water which will tend to attract game fish in the vicinity to the bait extended below and behind the float.

This invention is susceptible of various embodiments without departing from the spirit thereof and attention is directed to the appended claims for limitation of the scope of the invention.

What is claimed is:

1. In a fishing float, a cylindrical air chamber, longitudinally extending vanes mounted on the upper and lower surfaces of said cylindrical air chamber, each of said vanes being disposed at right angles to the adjacent vane, and vertical light reflecting ribs arranged in parallel on the surfaces of said vanes.

2. In a fishing float, a cylindrical air chamber, longitudinally extending and inwardly tapered vanes mounted on the upper and lower surfaces of said air chamber, each of said vanes being disposed at right angles to the adjacent vane, and parallel ribs formed in the outer surfaces of said vanes.

OLIVER K. HEARNE.

REFERENCES CITED

The following references are of record in the file of this patent:

UNITED STATES PATENTS

| Number | Name | Date |
|---|---|---|
| 1,193,912 | Maire | Aug. 8, 1916 |
| 2,153,869 | Jones | Apr. 11, 1939 |
| 2,322,241 | Kurz | June 22, 1943 |
| 2,338,577 | Divine | Jan. 4, 1944 |

FOREIGN PATENTS

| Number | Country | Date |
|---|---|---|
| 413,597 | Great Britain | July 19, 1934 |